US006268036B1

(12) United States Patent
Marinero et al.

(10) Patent No.: US 6,268,036 B1
(45) Date of Patent: Jul. 31, 2001

(54) THIN FILM DISK WITH HIGHLY FAULTED CRYSTALLINE UNDERLAYER

(75) Inventors: Ernesto Esteban Marinero, Saratoga; Timothy Martin Reith, Morgan Hill; Brian Rodrick York, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/105,503

(22) Filed: Jun. 26, 1998

(51) Int. Cl.$^7$ ........................................... G11B 5/66
(52) U.S. Cl. ................... 428/65.3; 428/65.6; 428/65.7; 428/694 T; 428/694 TS; 428/694 TM; 428/900; 204/192.2
(58) Field of Search ............... 428/694 T, 694 TS, 428/694 TM, 900, 65.3, 65.6, 65.7; 204/192.2

(56) References Cited

U.S. PATENT DOCUMENTS

| 5,084,152 | 1/1992 | Lin ................................. 204/192.15 |
| 5,134,038 | 7/1992 | Baseman et al. ..................... 428/611 |
| 5,147,734 | 9/1992 | Nakamura et al. ............... 428/694 T |
| 5,162,158 | * 11/1992 | Christner ............................. 428/611 |
| 5,232,566 | * 8/1993 | Edmonson ........................ 204/192.1 |
| 5,352,501 | 10/1994 | Miyamoto et al. ................ 428/65.7 |
| 5,434,014 | 7/1995 | Kanamara et al. ............. 428/694 T |
| 5,569,533 | * 10/1996 | Lal ...................................... 428/332 |
| 5,616,218 | * 4/1997 | Alex ................................. 204/192.15 |
| 5,744,253 | * 4/1998 | Lal ..................................... 428/611 |

FOREIGN PATENT DOCUMENTS 5012647   1/1993 (JP) .................................. G11B/5/66

OTHER PUBLICATIONS

D.E Laughlin et al., "The Control and Characterization of the Crytallographic Texture of Longitudinal Thin Film Recording Media", IEEE Trans. on Magnetics, vol. 32, No. 5, Sep. 1996, pp. 3632–3637.
Lal et al, "Effects of Cr and Magnetic Bias on Read/Write and Noise Characteristics of CoCrTa/Cr Longitudinal Thin–Film Media" J. Appl. Phys. (USA), vol. 81, No. 8, Apr. 15, 1997, pp. 3934–6.

* cited by examiner

Primary Examiner—Leszek Kiliman
(74) Attorney, Agent, or Firm—G. Marlin Knight (57) ABSTRACT

A improved thin film recording medium with an underlayer with deliberately induced strain, crystalline defects and dislocations (collectively "faults") in the grain structure is described. The relatively high number of induced faults results in surprising improvements in recording characteristics such as soft error rate, resolution and SNR of the thin film disk. While the film is being deposited, the sputtering conditions are controlled to grow grains of the underlayer material which tend to be highly faulted by incorporation of atoms of a second material with significantly different atomic characteristics than the underlayer material. Preferably the atoms of the sputtering gas species are incorporated in the film to cause the lattice faults. For example, the faults can be achieved by incorporating sputtering gas atoms, e.g. argon atoms, into a chromium based underlayer.

33 Claims, 4 Drawing Sheets

Figure 1

(PRIOR ART)

THIN FILM DISK WITH HIGHLY FAULTED CRYSTALLINE UNDERLAYER

FIELD OF THE INVENTION

This invention relates to the field of data storage devices such as disk drives having thin film magnetic disks. More particularly the invention relates to microstructure of the thin films and their effect on magnetic recording characteristics.

BACKGROUND OF THE INVENTION

The thin film magnetic recording disk in a conventional drive assembly typically consists of a substrate, an underlayer consisting of a thin film of chromium (Cr) or a Cr alloy, a cobalt-based ferromagnetic alloy deposited on the underlayer, and a protective overcoat over the magnetic layer. The word "magnetic" will be used to mean ferromagnetic, antiferromagnetic, ferrimagnetic or any other magnetic material suitable for magnetic recording. A variety of disk substrates such as NiP-coated AlMg, glass, glass ceramic, glassy carbon, etc., have been used. The microstructural parameters of the magnetic layer, i.e., crystallographic preferred orientation (PO), grain size, anisotropy and magnetic exchange decoupling between the grains, play key roles in the recording characteristics of the disk. The Cr underlayer is mainly used to control such microstructural parameters such as the PO, the unit cell size and grain size of the cobalt-based magnetic alloy.

One variation of the layer structure described above uses a very thin initial seed layer on the substrate to establish an appropriate nucleation base for the underlayer. Various materials have been used or proposed for seed layers, for example, Al, Cr, $Ni_3P$, Ta, C, W, FeAl and NiAl. Laughlin, et al., have described use of an NiAl seed layer followed by a Cr underlayer and a CoCrPt magnetic layer. The NiAl seed layer with the Cr underlayer was said to induce the [10$\bar{1}$0] texture in the magnetic layer. (See "The Control and Characterization of the Crystallographic Texture of Longitudinal Thin Film Recording Media", IEEE Trans. Magnetic. 32(5) September 1996, p. 3632).

The PO of the various materials forming the layers on the disk, as discussed herein, is not necessarily an exclusive orientation which may be found in the material, but is merely the most prominent orientation. When the Cr underlayer is sputter deposited at a sufficiently elevated temperature on a NiP-coated AlMg substrate a [200] PO is usually formed. This PO promotes the epitaxial growth of [11$\bar{2}$0] PO of the hexagonal close-packed (hcp) cobalt (Co) alloy, and thereby improves the magnetic performance of the disk. The [11$\bar{2}$0] PO refers to a film of —hexagonal structure whose (11$\bar{2}$0) planes are predominantly parallel to the surface of the film. (Likewise the [10$\bar{1}$0] PO refers to a film of hexagonal structure whose (10$\bar{1}$0) planes are predominantly parallel to the surface of the film).

In the prior art the optimal underlayer structure was believed to be one with as little deviation from the target PO as possible. For example, if [200] PO was the design goal for the underlayer, then it was thought that the more narrow the distribution of the orientation of the grains, the better and ideally every grain would be [200].

Alloys of chromium have been used for the underlayer. For example, CrTi and CrV have been used. The addition of limited amounts of titanium or vanadium modifies the lattice parameters by atomic substitution, but the crystalline nature of the underlayer is not modified.

SUMMARY OF INVENTION

An improved thin film magnetic recording medium with an underlayer with deliberately induced strain, crystalline defects and dislocations (collectively "faults") in the lattice structure of the grains is described. The relatively high density of induced faults in the underlayer results in surprising improvements in recording characteristics such as resolution, soft error rate and signal-to-noise ratio (SNR) of the thin film disk. Although ion implantation is one way to create the faults in the underlayer, it is preferred to sputter deposit the underlayer under conditions which cause the faults to form as the film grows. The film is preferably sputter deposited using materials and parameters selected to grow grains of the underlayer material which tend to be highly faulted by incorporation of a second material which has sufficiently different characteristics to disrupt the lattice structure of the underlayer material without altering the basic crystallographic orientation. Thus, for example, a bcc structure would still be present in a Cr based underlayer even though it is highly faulted. Preferably for any particular sputtering system, the sputtering equipment and/or conditions can be adjusted to control the energy characteristics of the sputtering gas ions/atoms to ensure that the atoms of the sputtering gas will be incorporated in the film to cause the desired density of lattice faults. In the following, the underlayer of the invention will be referred to as a "Hi-fault" underlayer for convenience.

DETAILED DESCRIPTION OF THE PREFERRED EMBODIMENTS

The inventors have discovered that surprising improvements in the performance of a magnetic thin film disk result from deliberately introducing strain, crystalline defects and dislocations (collectively "faults") into the crystalline lattice of the underlayer of thin film disk for magnetic recording. These nonuniformities result in an increase in the distribution of the lattice parameters, preferred orientation and grain tilt in the underlayer. The deliberate introduction of faults into the underlayer structure is contrary to the prior art teaching that the underlayer grains should be well segregated and as uniform as practical. The faults affect the growth of the magnetic grains and, therefore, the recording characteristics such as Mrt, coercivity (Hc), resolution and soft error rate of the thin film disk. Applicants have been able to significantly reduce the soft error rate of a magnetic recording disk by increasing the fault density. An important consequence of this is that it is possible to alter the microstructure of both the underlayer and the magnetic alloy to optimize recording characteristics by a judicious selection of the sputtering equipment and parameters which control the energy levels of the sputtering gas ions/atoms and influence the "fault density" in the underlayer. Although the detailed embodiment of the invention which will be described relates to films for longtitudinal recording which the easy axis is predominantly in the plane of the disk surface, the principles apply to films for vertical recording as well.

In order to illustrate one of the principles of the invention, assume that chromium is the primary element in the underlayer and that argon is the sputtering gas. Argon is a noble gas and has very different characteristics than chromium does. Although use of the invention does not require a theoretical understanding of exactly which characteristics and kinetic conditions of a material are necessary and/or sufficient to disrupt the lattice of an underlayer material, the following concepts are suggested for consideration. Chromium is a bcc structured material and argon is noble. While atomic volume numbers found in references vary (presumably based on the measurement conditions and assumptions), relative comparison of the atomic volumes is potentially interesting. Using Barrett and Massalski (1980) data, chromium (Cr) is 12 cubic Angstroms ($Å^3$) per atom and argon (Ar) is 40 $Å^3$ per atom. Thus, at more than three times the volume of Cr, it is reasonable to infer that incorporation of the size mismatched Ar atoms into a Cr film could disrupt the Cr lattice. It is also reasonable to conclude that the kinetics of the sputtering process play an important role. The positive argon ions arriving at the film may be expected to have significantly greater kinetic energy than the neutral chromium atoms. The data given below shows that the amount of argon being incorporated into the film can be increased by increasing the kinetic energy of the argon ions at the film. The inventors' data also suggests that the fault density in the film will be approximately proportional to the atomic percentage of Ar in the film.

Argon is a convenient choice since it is the most commonly used sputtering gas, but xenon, krypton and neon give similar results. Of these neon has the smallest atomic volume. Since the ability to disrupt the underlayer lattice does not require that the material be noble it is to be expected that other materials with characteristics sufficiently different from the underlayer material can be used to achieve the benefits of the invention. The noble gases are convenient to use to generate the faults since they are used as sputtering gases, but addition of reactive species such as $H_2$, $N_2$, $CH_4$ or $SF_6$ for example, in the sputtering chamber will be expected to affect the strain, structure, etc. and if used selectively and judiciously could achieve similar results. These reactive species will form chemical bonds which will locally affect the lattice parameters, strain and crystallographic structure. The overall bcc structure of the underlayer should be preserved, so it will be important to keep the percentage of bonding sites low enough to ensure that the bcc structure dominates.

In contrast to the sputtering gases noted above, the titanium and vanadium atoms, which are typically alloyed with Cr in underlayers, are similar in size to chromium at approximately 18 and 14 $Å^3$ per atom respectively and arrive at the film as neutral species. The addition of small quantities titanium and/or vanadium to Cr will tend to expand the lattice, but will not disrupt the lattice as is required for a Hi-fault underlayer.

The degree of incorporation of the sputtering gas (or other material) into the underlayer is a complex function of the materials' properties, the sputtering system design and the particular set of parameters being used with the system. Some of the factors, for example, anode to cathode spacing are difficult to vary without redesigning the sputtering system. Other factors such as temperature, gas species, gas pressure and substrate bias voltage are relatively easy to change. For a given sputtering system such as a commercial in-line sputtering system from Ulvac or Leybold-Heraeus, the bias voltage has been found to be the preferred way to vary the amount of the sputtering gas incorporated into the underlayer and, therefore, the fault density. When other factors are held constant, the amount of the sputtering gas in the film will tend to increase with the negative bias voltage on the substrate. For example, the data in Table 1 shows that varying the bias voltage from 0 to −500v while keeping the other sputtering conditions relatively constant resulted in an increase in the argon in the chromium underlayer from approximately 0.3 at. % to 9.6 at. %.

TABLE 1

| Sample | Bias Voltage | Argon at. % |
| --- | --- | --- |
| A | 0 | 0.3 (+/− 1) |
| B | −150 | 1.2 (+/− 1) |
| C | −300 | 3.1 (+/− 1.5) |
| D | −500 | 9.6 (+/− 2) |

The exact set of parameters to be used for a particular sputtering system will be determined empirically as is typical in the prior art of sputtered thin film disks. For example, in the experiments represented in Table 1, the recording characteristics of samples A and B were not significantly different. Sample C, however showed significant improvements. Sample D was not significantly improved over sample C, so for this set of conditions, a negative bias voltage of 300v would be the preferred choice to achieve approximately 3 at. % argon in the underlayer. Since the data shows that the improvement occurred between the 150 volt sample with 1.2 at. % argon and the 300 volt sample with 3.1 at. % argon, it suggests about a 2 at. % lower limit for significant improvement under these particular conditions.

The limit on the amount of argon or other noble gas which can be incorporated into a chromium based underlayer is determined primarily by stability. Since the noble gas atoms are not chemically bonded to the surrounding atoms, incorporation requires that the surrounding atoms form a physical barrier to the release of the gas atoms. Therefore, it should be expected that no more than about 12 at. % argon, for example, can be retained in the underlayer. However, as the examples discussed above indicate, the improvements from inducing faults in the underlayer can be expected to plateau at some point and increases in the sputtering gas or other second material content beyond that point may not be beneficial.

Figure 3:
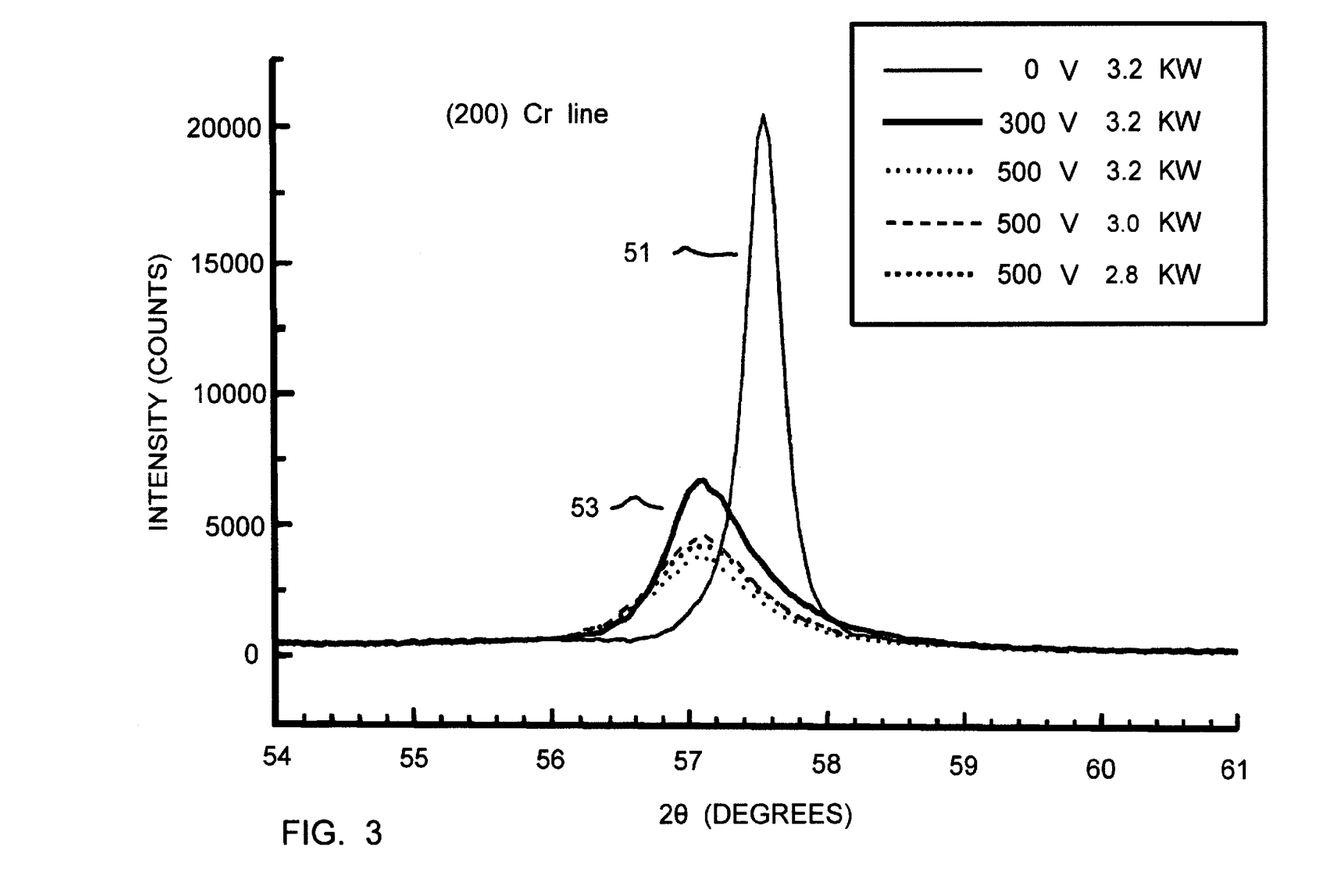
FIG. 3 is a graph of x-ray diffraction intensity of six Cr underlayers deposited using varying parameters.

As noted above the prior art teaches that a narrow distribution of crystal orientations is desirable in the underlayer. This prior art teaching is related to the idea that the shape of the grains in the film should be regular and uniform. Applicants have discovered that this teaching is incorrect at least for a significant number of thin film disk designs. The authors have found that the improved recording characteristics such as the significant decrease in soft error rate mentioned above is also correlated with a decrease in the strength of the preferred orientation. Reference to FIG. 3 shows that underlayers prepared as taught herein have an increased distribution of orientations. FIG. 3 is a standard graph of the intensity of x-ray diffraction intensity (vertical axis) as a function of the angle of incidence (horizontal axis). The first sample (line 51) was deposited using no, i.e. zero, negative bias voltage and 3.2 kW of heater power (which in turn influences the substrate temperature). Line 51 on the graph shows a strong, narrow peak between 57 and 58 degrees (2θ) at about 57.4 degrees which corresponds to a strong [200] chromium orientation. This highly oriented film is typical of underlayer films considered ideal in the prior art. Other orientations of underlayers such as [110] can also be used. The precise angle which corresponds to a particular crystallographic orientation is a function of the stresses, material composition, etc. The other five lines on the graph are Hi-fault sample films which were deposited with negative bias ranging from 300v to 500v and heater power being varied from 3.2 kW to 2.8 kW, but were otherwise similarly deposited. All of the Hi-fault samples showed significantly reduced [200] orientation. For example, the Hi-fault underlayer represented by line 53 (for the −300v, 3.2 kW sample) had a peak at about 57.0 degrees which is substantially lower than the highly oriented underlayer represented by line 51, as well as, a reduction to less than one-third of the amplitude of the [200] peak and a significant broadening of the curve over the standard underlayer represented by line 51. The other Hi-fault samples showed even larger reductions in the amplitude of [200] orientation, but with no further obvious reductions of the angle of the peak. As discussed above the bulk of the changes occurred with −300v bias and increasing to −500v resulted in smaller incremental improvements.

A potential alternative to growing the underlayer film with the faults developing as the film grows is to induce the faults in the lattice structure by ion implantation after the underlayer has been deposited. In this method a standard underlayer would be sputtered onto the disk and then bombarded with sufficiently energetic ions of argon, for example, which would penetrate and disrupt the lattice structure of the grains to achieve the faults. In this method it would be expected that the fault density would be nonuniform with the depth in the film. The sputtering method is preferred over ion implantation for use in mass production since it is simpler and less expensive to implement.

The fault density results in an increase in the mosaic spread of the angle of the crystallites from the rocking curve net x-ray intensity. For example, one set of Hi-fault underlayers showed an increase in the mosaic spread of about 1.3 over a comparable low fault underlayer. While the absolute value of the mosaic spread varies strongly with other parameters such as substrate micro-topography, the relative increase in the mosaic spread also corresponds to the relative increase in the fault density.

Figure 4:
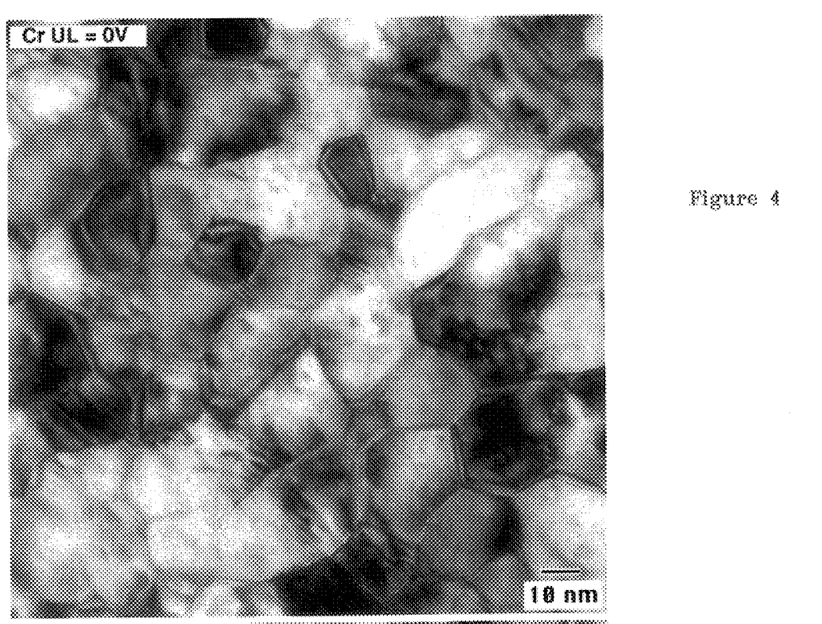
FIG. 4 is a copy of a TEM image of a cross section of a prior art thin film disk showing the grain structure of the underlayer.
Figure 5:
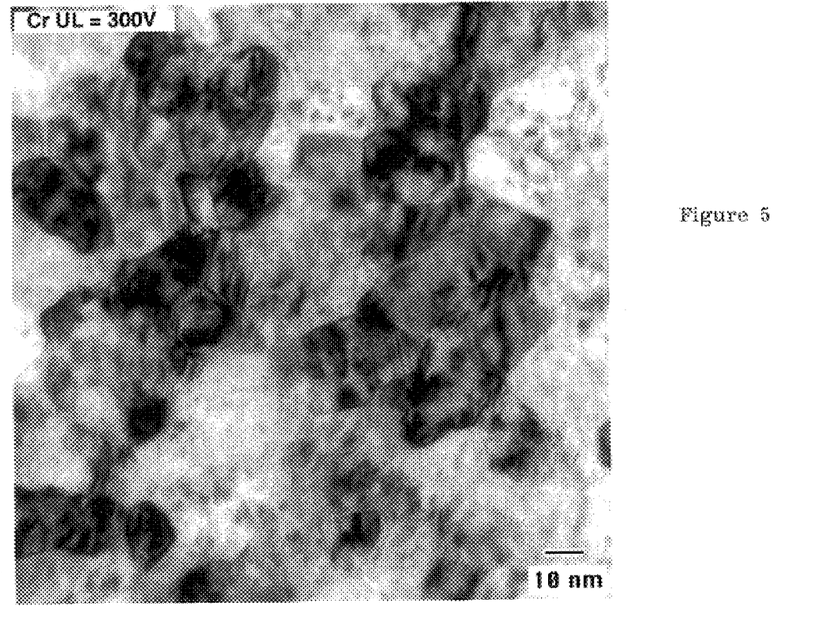
FIG. 5 is a copy of a cross section TEM image showing the grain structure of the underlayer of a thin film disk with a Hi-fault underlayer of the invention.

The effects of the Hi-fault underlayer on the magnetic characteristics are the result of microstructural changes in the magnetic layer that follow from the high fault density in the underlayer. For example, a reduction in effective grain size results as a consequence of the higher number of faults evident within the CrX grains. FIG. 4 is a copy of a cross-sectional TEM image of a highly [200] oriented films which shows the grain structure with straight vertical columns with a smooth interface between the Cr underlayer and the magnetic layer. Highly oriented films will, of course, have some faults and there will be some sputtering gas incorporated therein. Applicants estimate that in a typical highly oriented film, less than 5% of the grains will have faults which are observable with a TEM. In contrast to a highly oriented film, a Hi-fault film as pictured in FIG. 5 has irregular, skewed columnar growth and a noticeable interfacial roughness with the magnetic layer. A properly made Hi-fault film will have observable faults in a significant percentage (probably a majority) of the grains and preferably perhaps as high as 95% or more of the grains.

An embodiment of the invention's thin film recording structure with a Hi-fault underlayer will be described. With the exceptions noted below, the substrate, optional seed layer, underlayer and protective overcoat are sputtered according to prior art methods known to those of skill in the art. The seed layer may be included or omitted according to prior art principles.

The alloy used for the magnetic layer with a Hi-fault underlayer is not particularly constrained, but the magnetic material in the alloy is preferably cobalt. The magnetic cobalt alloy forms hexagonal-close-packed (hcp) crystals. Applicants preferred magnetic alloys are a quaternary alloy of CoPtCrTa or CoPtCrB, but numerous other alloys in current use such as CoPtCr will have similar behavior when used with the Hi-fault underlayer described herein. The optimum temperature, as with most sputtering parameters, will vary from system to system as is well known to those skilled in the art, but will be expected to be from 150C to 500C. The negative voltage bias, if needed, is preferably used during the growth of the underlayer. The minimum value of negative bias voltage ranges from that needed to incorporate a sufficient amount of the sputtering gas, e.g. argon, or other material into the underlayer to achieve the high fault density. At some upper limit point significant re-sputtering becomes a limitation. A typical range for the bias voltage would be expected to be from about 150v to 500v. The actual optimum bias voltage will vary from one sputtering machine to another and therefore should be determined empirically. The bias voltage is used to increase the average energy level of the ions arriving at the film surface and, therefore, the amount of the sputtering gas or other material being incorporated into the underlayer. It is believed that typically the sputtering gas goes into the film as neutral atoms since the overall film is neutral and the sputtering gas is noble. Since the sputtering gas is ionized in the plasma, but incorporated as atoms, the term "ions/atoms" will be used to cover both states. Argon is the most commonly used sputtering gas and the following will assume that argon is being used, but any other sputtering gas may also be used. The requisite amount of argon in a Cr film is believed to be at least 0.5 at. %, but is preferably more than 2 at. % and even more preferably more than 3 at. %. Since the goal is to achieve the faulted structure, the secondary parameters/quantities such as bias voltage and atomic percentage of sputtering gas incorporated in the film should be set empirically to be at least high enough to get the high fault density in the underlayer.

Although it is convenient to use negative bias with standard commercial sputtering systems currently available, as noted above modifications of the sputtering system such as anode to cathode spacing may eliminate the need to use bias. Other hardware modifications to facilitate the incorporation of a sputtering gas or other material into the underlayer film structure with concomitant faulting of the structure include: (1) the placement of a negatively biased grid in front of the disk substrate, (2) the use of "unbalanced magnetrons" which allow, typically, the placement of a mid-frequency (10 to 40 kHz) signal on either opposing or adjacent sputter cathodes, and (3) the use of ion beam deposition which affords separate and precise control of sputter gas ions with respect to both their direction, speed, and acceleration.

In addition to Cr, other known underlayer materials such as CrTi and CrV should be expected to work in the invention as well. Note that although it is not conventional to list the sputtering gas as part of the underlayer or magnetic layer, when the high percentages of argon, etc. are used, it might be more descriptive to call the underlayer alloy CrAr, CrArV, CrTiAr, etc.

In general standard sputtering techniques are used to deposit each of the thin film layers of a disk embodying the invention. The bias and temperature conditions have been noted. In addition, the oxygen or impurities in the underlayer should be kept low, since increased oxygen is known to affect magnetic properties and may alter crystalline growth characteristics in the underlayer.

Figure 2:
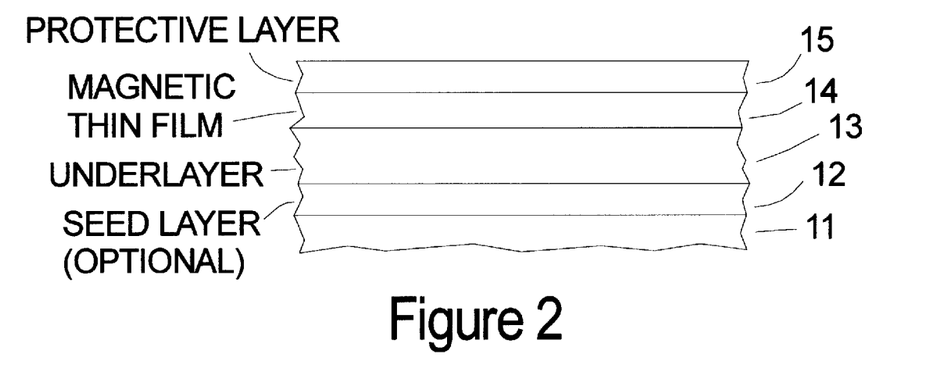
FIG. 2 illustrates the layer structure of a thin film magnetic disk embodying the invention.

FIG. 2 illustrates the cross sectional layer structure of an embodiment of the invention in a thin film magnetic disk. The thin film layers will be sputter deposited onto at least one and preferably both planar surfaces of the substrate 11 to form the data recording area of the disk. The shading is used only to differentiate the layers and not to indicate color or specific composition. The invention may be used with substrates made of AlMg/NiP, glass, SiC/Si or any other suitable material. The substrate 11 in the preferred embodiment is composed of a AlMg alloy base with an electroless NiP smoothing/hardening surface layer. The seed layer 12 is an optional layer that may be used to improve magnetic properties such as coercivity. The seed layer 12 is most commonly used when the substrate surface is nonmetallic, e.g. glass. The seed layer may be any one of the materials which are known in the prior art to be useful as seed materials. For example, a thin seed layer consisting of tantalum (Ta) may be used with a suitable underlayer and a CoPtCrB or CoPtCrTa magnetic layer. The seed layer of Ta promotes the [200]orientation in the underlayer. In contrast, a NiAl seed layer on a glass substrate can be expected to have a mixed PO of [211]and other orientations such as [110].

The thicknesses of the standard seed, underlayer and magnetic layers are not believed to be critical for practicing the invention and can be determined according to prior art principles. Therefore, the thickness ranges given below are merely included as illustrative guidance. Typical thickness ranges currently in use are: seed layer between 2 and 50 nm, underlayer between 10 and 80 nm and magnetic layer between 5 and 50 nm. Variations in the thickness of the underlayer result in changes in the magnetic characteristics such as coercivity. A typical value for the thickness of the underlayer is about 50 nm.

As noted above the choice or composition of the alloy for the magnetic layer is not critical and can be made according to prior art principles. Applicants prefer to use CoPtCrB or CoPtCrTa, but this in no way implies a limitation. The following composition ranges are likewise given as Applicants general preferences, but do not imply limitations on the use of the Hi-fault underlayer of the invention. The CoPtCrB alloy comprises 4 to 12 at. % platinum, 10 to 23 at. % chromium and 2 to 20 at. % boron with the rest being Co. An example of a complete layer structure of a disk embodying the invention would be: AlMg/NiP—Cr—CoPtCrB— overcoat. The CoPtCrTa alloy comprises 4 to 12 at. % platinum, 10 to 23 at. % chromium and 1 to 6 at. % tantalum with the rest being Co. An example of a complete layer structure of a disk embodying the invention would be:
    glass—Ta—Cr—CoPtCrTa— overcoat.

The use, composition and thickness of the overcoat 16 are not critical in practicing the invention, but by way of an example a typical thin film disk might use an overcoat of carbon optionally doped with hydrogen and/or nitrogen. The overcoat is typically less than 15 nm thick.

All of the layers described above from the seed layer to the overcoat can be sputtered in a continuous process in either an in-line sputtering system or a single disk system. The layers are sequentially sputter deposited. The seed layer is deposited first, followed by the underlayer, then the magnetic layer. The optional last step deposits a protective overcoat. The Hi-fault underlayer can be used on smooth or circumferentially textured substrates.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films 5 at. % hydrogen contamination has been measured in a typical sputtered layer. It is also known that some small amount of oxygen is normally found in Cr targets and in the resulting Cr layer. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive (MR), giant magnetoresistive (GMR) or inductive heads and can be used in contact recording or with flyable heads. The read/write head is positioned over the rotating disk in the standard manner to either record or read magnetic information.

Figure 1:
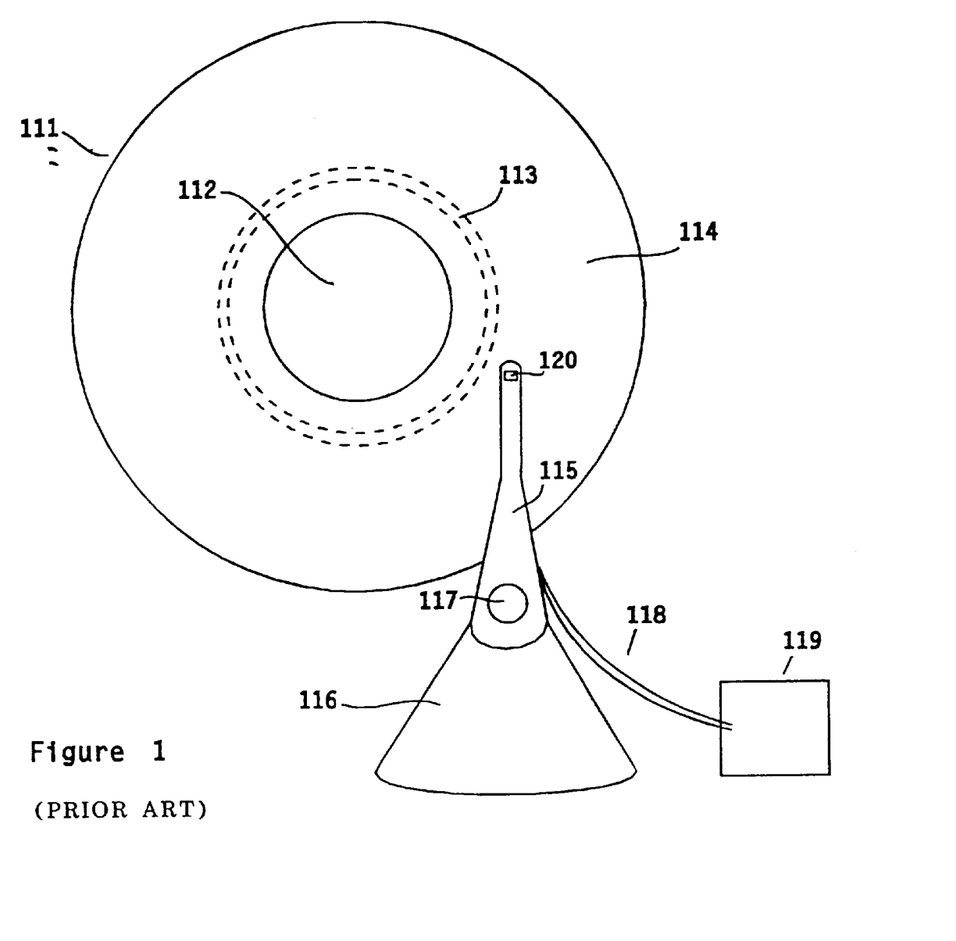
FIG. 1 illustrates a top view of a prior art disk drive with a rotary actuator of the sort in which the disk of the invention can be employed.

The thin film disk of the invention can be used with any magnetic disk drive design. Without implying limitation, FIG. 1 is a top view illustrating a prior art disk drive with a rotary actuator useful in practicing the present invention. The system comprises one or more magnetic recording disks 111 mounted on spindle 112 which is rotated by a spindle motor which is an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

While the preferred embodiments of the present invention have been illustrated in detail, alternative embodiments of the invention are realizable without deviating from the scope and spirit of the invention.

What is claimed is:

1. A thin film magnetic recording medium comprising:
    a thin film underlayer composed primarily of one or more elements in a plurality of grains, a majority of the grains having a lattice structure with faults induced by incorporation of at least one second material into the underlayer; and a thin film magnetic layer.

2. The thin film magnetic recording medium of claim 1 wherein the second material comprises at least 2 at. % of the underlayer.

3. The thin film magnetic recording medium of claim 1 wherein the second material comprises at least 3 at. % of the underlayer.

4. The thin film magnetic recording medium of claim 1 wherein the underlayer includes chromium and the second material includes argon.

5. The thin film magnetic recording medium of claim 1 wherein the underlayer includes chromium and has an x-ray diffraction pattern with a peak at a first angle which is less than an angle corresponding to a preferred orientation of [200] chromium.

6. The thin film magnetic recording medium of claim 1 wherein more than 95% of the grains of the underlayer have a lattice structure with faults therein.

7. The thin film magnetic recording medium of claim 1 wherein:

the underlayer includes chromium and has an x-ray diffraction pattern with a peak at a first angle which is less than an angle corresponding to a preferred orientation of [200] chromium;

the second material is argon and comprises more than 2 at. % of the underlayer; and more than 95% of the grains of the underlayer have a lattice structure with faults therein.

8. A thin film magnetic recording medium comprising:

a thin film underlayer composed of grains, a majority of the grains having a lattice structure with faults therein, the grains being primarily composed of one or more elements of a first atomic volume, the faults in the lattice structure being induced by incorporation of atoms of one or more elements with a second atomic volume, the second volume being not equal to the first volume; and a thin film magnetic layer.

9. The thin film magnetic recording medium of claim 8 wherein the elements of a second atomic volume comprises at least 0.5 at. % of the underlayer.

10. The thin film magnetic recording medium of claim 9 wherein the first atomic volume is equal to an atomic volume of chromium and the second atomic volume is equal to or greater than an atomic volume of neon.

11. The thin film magnetic recording medium of claim 8 wherein the underlayer includes chromium and has an x-ray diffraction pattern with a peak at a first angle which is less than an angle corresponding to a preferred orientation of [200] chromium.

12. The thin film magnetic recording medium of claim 8 wherein more than 95% of the grains of the underlayer have a lattice structure with faults therein.

13. The thin film magnetic recording medium of claim 8 wherein:

the underlayer includes chromium and has an x-ray diffraction pattern with a peak at a first angle which is less than a second angle corresponding to a preferred orientation of [200] chromium;

the one or more elements with a second atomic volume includes argon and comprises more than 2 at. % of the underlayer; and more than 95% of the grains of the underlayer have a lattice structure with faults therein.

14. A disk drive comprising:

a spindle;

a motor for rotating the spindle; and a thin film magnetic disk mounted on the spindle, the disk comprising:

a thin film underlayer composed primarily of one or more elements in a plurality of grains, a majority of the grains having a lattice structure with faults induced by incorporation of one or more second materials into the underlayer; and a thin film magnetic layer.

15. The disk drive of claim 14 wherein the underlayer includes chromium and the second material is argon which comprises at least 2 at. % of the underlayer.

16. The disk drive of claim 14 wherein the underlayer includes chromium and has an x-ray diffraction pattern with a peak at a first angle which is less than an angle corresponding to a preferred orientation of [200] chromium.

17. The disk drive of claim 15 wherein more than 95% of the grains of the underlayer have a lattice structure with faults therein.

18. The disk drive of claim 14 wherein:

the underlayer includes chromium and has an x-ray diffraction pattern with a peak at a first angle which is less than an angle corresponding to a preferred orientation of [200] chromium;

the second material is argon and comprises more than 0.5 at. % of the underlayer; and more than 95% of the grains of the underlayer have a lattice structure with faults therein.

19. A method of manufacturing a thin film disk comprising the steps of:

sputtering an underlayer including chromium onto a surface of a substrate while supplying energy to ions of a sputtering gas to induce a majority of grains in the underlayer to have faults in a lattice structure of the grains by incorporation of atoms of the sputtering gas; and sputtering a magnetic layer onto the underlayer.

20. The method of claim 19 the step of sputtering the underlayer further comprising placing a negatively biased grid in front of the substrate.

21. The method of claim 19 the step of sputtering the underlayer further comprising using unbalanced magnetrons and a 10 to 40 kHz frequency signal on either opposing or adjacent sputter cathodes.

22. The method of claim 19 the step of sputtering the underlayer further comprising using an ion beam to control the energy of sputter gas ions.

23. The method of claim 19 the step of sputtering the underlayer further comprising placing a negative voltage bias on the surface of the substrate.

24. The method of claim 23 wherein the negative voltage bias is from 150v to 500v.

25. The method of claim 19 wherein the supplied energy to the sputtering gas ions induces the sputtering gas atoms into the underlayer so that at least 2 at. % of the underlayer is composed of atoms from the sputtering gas.

26. The method of claim 25 wherein the underlayer includes chromium and the sputtering gas includes argon.

27. The method of claim 26 wherein the underlayer includes chromium and has an x-ray diffraction pattern with a peak at a first angle which is less than a second angle corresponding to a preferred orientation of [200] chromium.

28. The method of claim 26 wherein more than 95% of the grains of the underlayer have a lattice structure with faults therein.

29. The method of claim 24 wherein:
   the underlayer includes chromium and has an x-ray diffraction pattern with a peak at a first angle which is less than a second angle corresponding to a preferred orientation of [200] chromium;
   the second material includes argon and comprises more than 2 at. % of the underlayer; and
   more than 95% of the grains of the underlayer have a lattice structure with faults therein.

30. The thin film magnetic recording medium of claim 1 further comprising a seed layer of tantalum.

31. The thin film magnetic recording medium of claim 1 further comprising a NiAl seed layer.

32. The thin film magnetic recording medium of claim 1 wherein the underlayer has a preferred orientation of [110].

33. The thin film magnetic recording medium of claim 1 wherein the underlayer is chromium based and has a preferred orientation of [110], the medium further comprising a NiAl seed layer.

* * * * *